US005165625A

United States Patent [19]

Gutman

[11] Patent Number: 5,165,625

[45] Date of Patent: Nov. 24, 1992

[54] BREATHABLE GAS SUPPLY INSTALLATION FOR AIRCRAFT INCLUDING TEST MEANS

[75] Inventor: Georges Gutman, Louveciennes, France

[73] Assignee: Intertechnique, France

[21] Appl. No.: 793,113

[22] Filed: Nov. 18, 1991

[30] Foreign Application Priority Data

Nov. 16, 1990 [FR] France ................................ 90 14307

[51] Int. Cl.$^5$ .......................... A62B 7/14; B64D 13/02

[52] U.S. Cl. ............................ 244/118.5; 128/201.28; 128/204.18; 128/205.25

[58] Field of Search .......................... 244/118.5, 129.1; 128/201.28, 202.13, 202.26, 204.18, 204.26, 206.27, 205.25, 204.29, 205.11

[56] References Cited

U.S. PATENT DOCUMENTS 2,824,557 2/1958 Mejean et al. ................. 128/201.28
2,934,293 4/1960 Boehe et al. ...................... 244/118.5
3,503,394 3/1970 Hotz et al. ...................... 128/202.13
3,615,250 10/1971 Vernon ........................... 128/202.26
4,481,945 11/1984 Leviwe ........................... 128/202.13
4,651,728 3/1987 Gupta et al. .................... 128/201.28
4,909,247 3/1990 Terrisse et al. ................ 128/204.29
4,919,124 4/1990 Stevenson et al. ............. 128/202.26
4,960,119 10/1990 Hamlin ........................... 128/204.18

FOREIGN PATENT DOCUMENTS 125447 11/1984 European Pat. Off. .
3802874 11/1988 Fed. Rep. of Germany ........................ 128/204.18
741127 3/1933 France .
436546 10/1935 United Kingdom .
957441 5/1964 United Kingdom .

*Primary Examiner*—Galen Barefoot
*Attorney, Agent, or Firm*—Larson and Taylor

[57] ABSTRACT

An energy apparatus for supplying breathable gas in an aircraft has a source of pressurized breathable gas and a feed pipe for feeding gas to the feed regulators of individual emergency equipments. The apparatus includes a test system for checking proper operation without consuming pressurized gas. The system includes an atmospheric air compressor having its outlet in communication with the feed pipe via a two-positioned selector constituted so that at rest it connects the source (generally oxygen under pressure) to the pipe and separates the pipe from the compressor, and when in a position to which it is brought on receiving compressed gas from the compressor, it separates the pipe from the supply.

9 Claims, 2 Drawing Sheets

BREATHABLE GAS SUPPLY INSTALLATION FOR AIRCRAFT INCLUDING TEST MEANS

BACKGROUND OF THE INVENTION

The present invention relates to emergency installations for supplying breathable gas in an aircraft, the installation having a supply of breathable gas under pressure and a feed pipe for feeding gas to the feed regulators of individual emergency equipments. On airliners, a delivery valve that operates automatically as soon as the user takes hold of the equipment is generally interposed between the pipe and each regulator.

Proper operation of the individual equipments (or at least of those for use by the crew) is verified before each flight on civil aircraft. At present, the verification is performed by taking gas from the on board emergency supply, generally constituted by a cylinder of oxygen under pressure. This method of verification draws off a portion of the supply and requires frequent replacements.

SUMMARY OF THE INVENTION

An object of the present invention is to provide an installation including individual equipment test means that avoid taking any gas from the supply of breathable gas while nevertheless satisfying safety requirements. One of these requirements is that the connection between the supply of gas under pressure and the regulator must not be interrupted (or between the supply and the delivery valve that operates automatically on use and which is placed upstream from the regulator). Indeed there would always be the risk of forgetting to reopen the connection after testing.

To this end, there is provided an installation with test means having an air compressor provided with filter means and having its outlet in communication with the feed pipe via a two-position selector constituted so that at rest it connects the supply of breathable gas (typically oxygen under pressure) to the pipe and separates the pipe from the compressor, and when in a position to which it is brought on receiving compressed gas from the compressor, it separates the pipe from the supply.

The air drawn by the compressor should pass through a filter to avoid pollution of the non-return valve, the pipe, the delivery valves, and the equipments with dust. The filter may dry the air sent towards the non-return valve in order to avoid any condensation which could be prejucidial to subsequent operation. Finally, it is advantageous for the filter, the compressor, or a buffer volume interposed between the compressor and the non-return valve to be provided with means for delivering desinfectant and/or germicide, thereby serving to desinfect not only the entire network through which the air passes, but also to desinfect the individual equipments.

It suffices for the compressor to deliver the gas at a pressure of a few bars, e.g. about 4 bars. The compressor is provided with an electric motor powered by the on board electricity network. It may be a positive displacement compressor or a rotary compressor. With a positive displacement compressor, means may be provided for scavenging the portion of the installation situated downstream from the compressor.

It can be seen that the above-defined installation makes it possible to test the equipments with outtaking breathable gas from the supply without nevertheless detrimentally affecting safety.

The invention will be better understood from the following description of particular embodiments given by way of non-limiting examples. The description refers to the accompanying drawings.

DETAILED DESCRIPTION OF PREFERRED EMBODIMENTS

Figure 1:
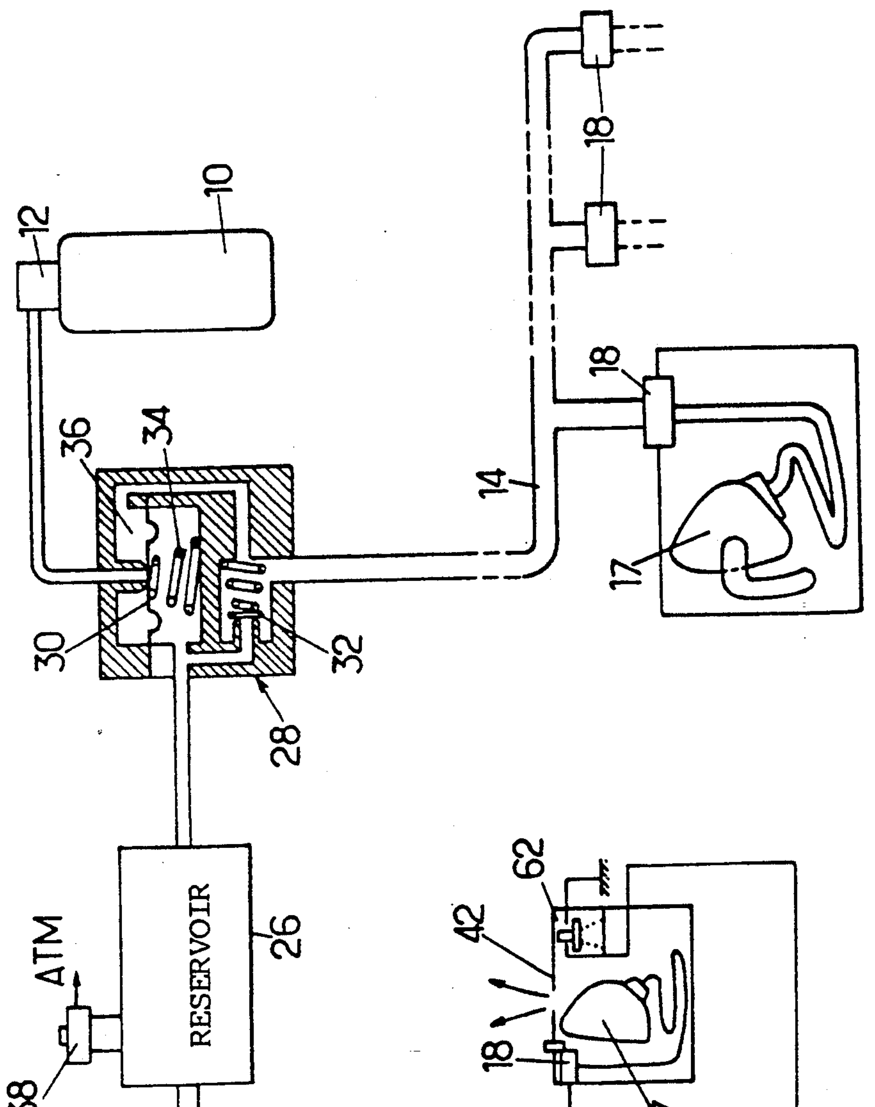
FIG. 1 is a diagram of the essential components of an installation.
Figure 1:
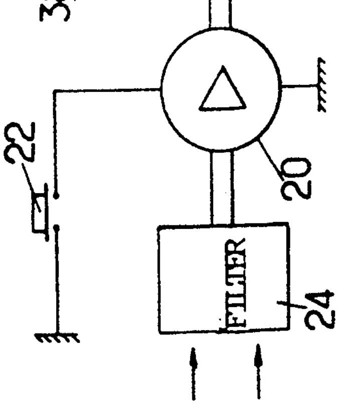

The installation shown in FIG. 1 conventionally includes a supply of breathable gas constituted, for example, by a cylinder of pressurized oxygen 10 provided with a pressure reducing valve 12. In flight, the cylinder must be permanently connected to a pipe 14 for distributing breathable gas to the safety equipments, via delivery valves that open automatically on use. As shown in the Figure, the pipe feeds safety breathing masks 17 for the flight deck crew, which masks are of a type suitable for being put on quickly, provided with demand regulators, and fed via respective delivery valves 18 each placed on the box in which the mask is stored and each of which opens automatically when the mask is taken out of its box. Boxes of this structure are in general used in the airline aircrafts. For reasons of economy, the delivery valve 18 is often omitted on business aircraft.

The installation of the invention includes a compressor 20 driven by an electric motor which is switched on and off by a switch 22. The inlet to the compressor 20 is connected to the atmosphere via a filter 24. The filter is intended to retain dust and to dry the air which is drawn in in order to avoid condensation in the installation. As mentioned above, it may also include means for injecting a germicide desinfectant product.

As shown, compressor 20 feeds a storage tank 26 having a capacity of a few liters and which is required for certain types of compressors only.

The outlet of pressure reducing valve 12 and the outlet of buffer tank 26 are both connected to a selector constituted by a multiple valve 28 which feeds the pipe from the supply 10 when the compressor is at rest, and from the compressor when the compresser delivers air at a pressure exceeding a determined value that depends on the outlet pressure of pressure reducing valve 12.

As shown in the Figure by way of example, the multiple valve 28 includes two closure members 30 and 32 for controlling connection of the pipe 14 respectively to the supply 10 and to the compressor 20.

The first closure member 30 is constituted by a diaphragm cooperating with a seat defining an outlet passage from the supply 10. The closure member 30 is urged towards its closed position by the force exerted by a spring 34 and towards its open position by the outlet pressure from pressure reducing valve 12 which acts on the central portion of the member 30.

The second closure member 32 is constituted by a non-return check valve. When the non-return check valve 32 is open, the compressor 20 feeds the duct 14 and chamber 36 for balancing closure member 30.

During a test, the installation operates as follows:

Initially, the compressor 20 is at rest and the storage tank 26 at atmospheric pressure. The force exerted by the pressure of the breathable gas from supply 10, reduced to a few bars by the pressure reducing valve 12, holds the closure member 30 off its seat. The breathable gas then fills the duct 14 as far as the delivery valves 18.

To perform a test, compressor 20, designed to provide a pressure which is slightly greater than that provided by the expander 12, is energized. The non-return check valve 32 opens. The outlet pressure of the compressor is established on both sides of the diaphragm 30 which is then closed by spring 34. It then suffices to open the delivery valves 18 after one another to verify that the safety equipment operates properly.

Once testing has been performed, the compressor 20 is switched off. If it is desired that the pipe 14 should be filled with breathable gas from the supply 10 and the compressor 20 does not enable the buffer tank 26 to empty, then the tank can be emptied by opening a valve 38, preferably automatically and simultaneously with the compressor being switched off.

It can be seen that the gas consumed during the test comes only from the compressor 20 and is not taken from the supply 10.

Figure 2:
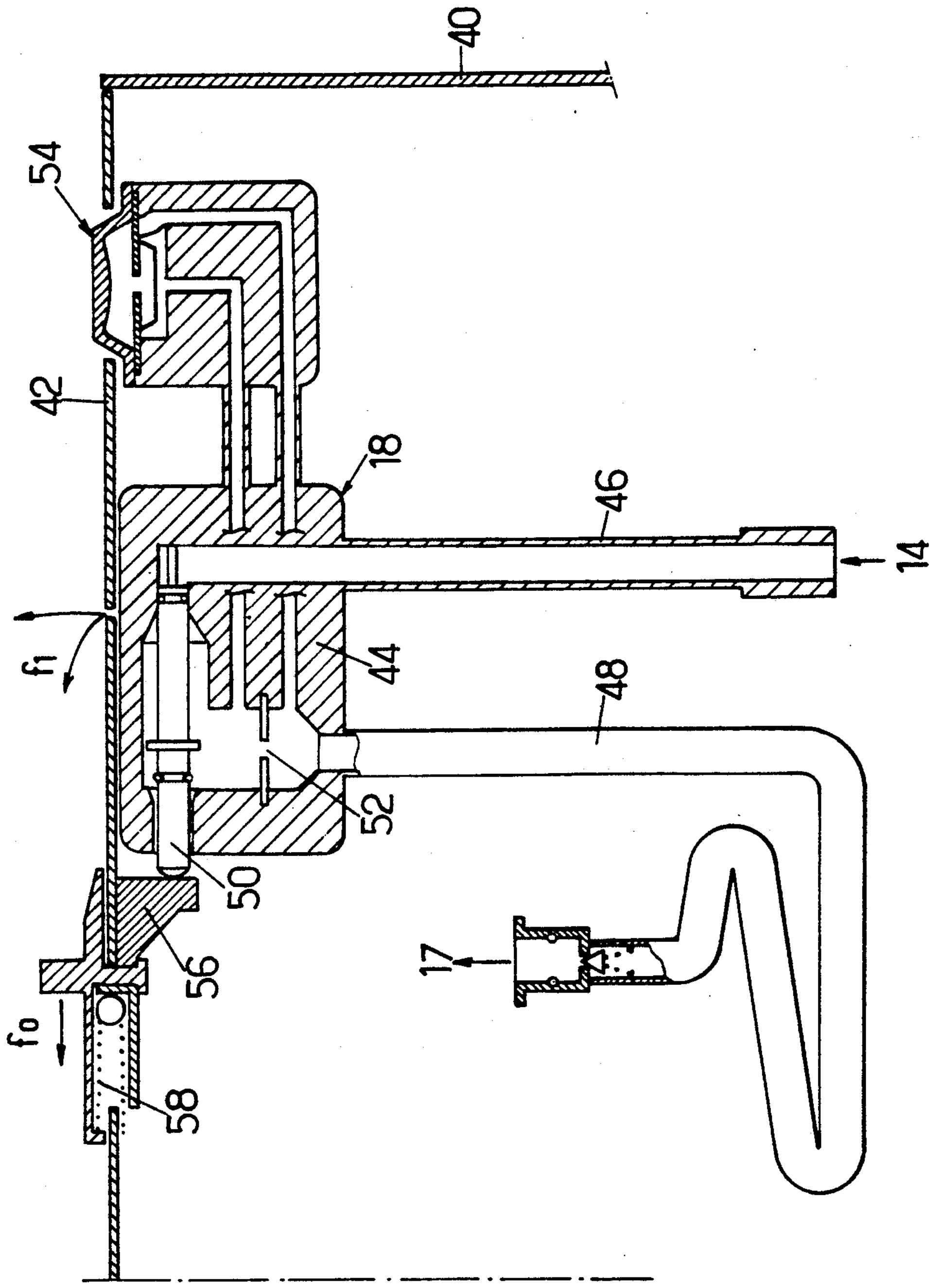
FIG. 2 is a diagram showing one possible structure for the delivery valves between the general pipe and individual equipments.

The above-described installation makes it possible, in particular, to verify proper operation of individual safety equipments constituted by breathing masks, each placed in a box within reach of a crew member. The delivery valve 18 can then be of the kind shown in FIG. 2 and may be placed in the box 40 in such a manner as to open automatically when the crew member lifts the lid 49 of the box to remove the mask it contains. The delivery valve 18 includes a housing 44 having a passage formed therethrough to put a feed tube 46 connected to the pipe 14 into communication with a hose 48 for connection to the mask and whose end closure valve is designed to be opened on connection to a mask. A piston 50 provided with O-rings is mounted in the housing 44 to slide between the position as shown in FIG. 2 where it separates the tube 46 from the hose 48 while connecting the hose 48 to the atmosphere, and a position in which it puts tube 46 into communication with hose 48. A constriction 52 on the path to the hose 48 sets up a pressure difference when gas flows that actuates an indicator 54 for verifying proper operation.

The pressure that exists inside the tube 46 tends to push out the piston 50 and establish communication with the hose 48. At rest, the piston 50 is held in closed position by a pusher 56 carried by the lid 42 and provided with a spring 58.

To verify that breathable gas reaches the mask, it suffices merely to displace the pusher 56 to the left (arrow f0 in FIG. 2) to release the piston 50. The same piston is released when the lid is opened (arrow f1).

Figure 3:
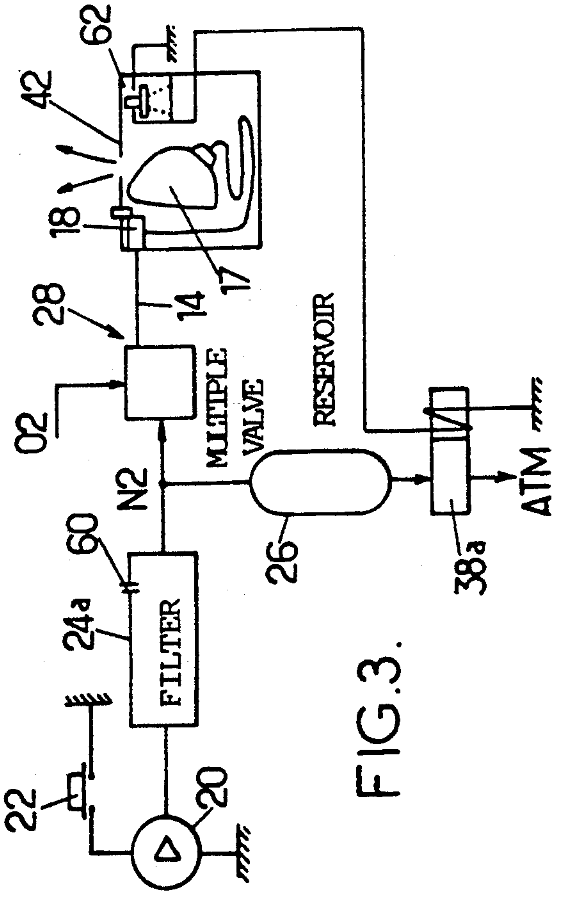
FIG. 3, similar to FIG. 1, shows a modified embodiment.

In the modified embodiment of the invention shown in FIG. 3, where the components corresponding to those of FIG. 1 are designated by the same reference numbers, the compressor 20 feeds the multiple non-return valve 28 via a permeation filter **24*a*, which retains the oxygen-containing substances in the air, in particular oxygen, water, and carbon oxides. A calibrated leak 60 dumps these oxygen-containing substances to the atmosphere. The multiple port valve 28** is thus fed with dry nitrogen. The permeation filters that are commercially available at present have a life time of about 10 years, which is more than enough requirements.

This embodiment is particularly advantageous in installations for feeding emergency equipments constituted by masks that are put in place quickly by delivering breathable gas from the supply to an inflatable harness. It would appear that feeding the breathable gas circuit for emergency equipments during testing with nitrogen that remains in the pipe work would be nonsense. However, since the volume of the pipework is small, the nitrogen—unsuitable for breathing—is quickly exhausted and replaced by breathable gas, e.g. pure oxygen, from the supply 10 upon harness inflation and leakages from the regulator to the surrounding air during the time that elapses between the moment the user takes the mask from the box and the moments the mask is pressed against the face.

In the embodiment shown in FIG. 3 the scavenging means **38*a* of the buffer tank 26 are constituted by a bistable electrically-controlled valve which is closed at the rest and whose switch-on circuit is closed by a switch 60 when the lid 42 is opened. This ensures that no oxygen is consumed between two series of tests. The unit constituted by the multiple non-return valve 28 and the pipe 14 remains filled with dry nitrogen. In contrast, if the buffer tank were to be scavenged after each test, breathable gas from the supply would fill pipe 14. A similar modification may be applied to the installation of FIG. 1**.

Still another modification of the embodiment of FIG. 3 consists in omitting the delivery valve 18 that is controlled automatically in response to lid opening, and in retaining electrically-controlled valve **30*a* controlled by the contact 62 to move from its closed position to its open position when the lid 42 is opened. Under such circonstances, it is the selector multiple valve 28** which acts as the cut-off valve. This solution may be used, in particular, in business aircrafts where the mask is often stored in a box that is not provided with a valve controlled by opening the door, with leaks being avoided by the demand regulators in the masks so long as there is no loss of pressurization or any other condition requiring that the masks be done in fulfilment of regulations.

I claim:

1. An emergency installation for supplying breathable gas in an aircraft, having:

- a storage supply of pressurized breathable gas;
- an electric motor driven atmospheric air compressor provided with intake filter means and with a delivery outlet;
- manually operable switch means for energizing and de-energizing said electric motor;
- a feed pipe for feeding breathable gas from said storage supply of compressed air from said compressor to regulators of individual emergency equipments; and
- a two-position selector valve having an outlet in communication with said feed pipe, a first inlet connected to receive compressed air from said compressor and a second inlet for continuous communication with said supply, said selector valve being constructed so that it automatically connects the supply to said feed pipe and separates the pipe from the compressor when not fed by compressed air from said compressor and it separates the feed pipe from the supply when said first inlet receives the pressurized air from the compressor.

2. An installation according to claim 1, further comprising a buffer tank interposed between the compressor and the selector valve, said buffer tank being provided with operator operated scavenging means.

3. An installation according to claim 1, further comprising a respective delivery valve located on the feed pipe upstream from each said emergency equipment and brought to open condition upon removal of said equipment from a storage position.

4. An installation according to claim 3, wherein each said individual emergency equipment is constituted by a breathing mask and said delivery valve feeding the mask is designed to open when a box for storage of the respective mask is opened.

5. An installation according to claim 4, further comprising a buffer tank interposed between the said compressor and said selector valve, said buffer tank being provided with an electrically-controlled scavenging valve which is opened in response to opening of any one of a plurality of mask-storing boxes.

6. An installation according to claim 1, further comprising means for injecting desinfectant and germicide into the compressed air upstream from the selector.

7. An installation according to claim 1, wherein said selector valve comprises a multiple valve having a first non-return check valve interposed on a passage of gas from said compressor to the feed pipe and a second check valve urged by a spring towards a position in which it cuts off inlet of pressurized breathable gas from the supply source, said second check valve being placed between a first chamber communicating with said feed pipe and a second chamber which is fed by the compressor for being opened upon depressurization of said second chamber.

8. An emergency installation for supplying breathable gas to crew members in an aircraft, having:

a supply of pressurized breathable gas;

a feed pipe for feeding gas from said supply to a plurality of regulators of respective individual emergency equipments;

and tests means for testing said installation, said test means comprising:

an atmospheric air compressor provided with intake filter means and a delivery outlet;

and a two-position selector valve having an outlet in communication with said feed pipe via a buffer tank, a first inlet connected to receive compressed air from said compressor and a second inlet for communication with said supply, said selector valve being constructed so that it connects the supply to said feed pipe and separates the feed pipe from the compressor when not fed by said compressor and it separates the feed pipe from the supply when said first inlet receives pressurized air from the compressor, wherein said feed pipe feeds all said regulators directly, and wherein said buffer tank is provided with scavenging means constituted by an electrically-controlled exhaust valve which is opened in response to any one of boxes each containing one of said equipments.

9. An emergency installation for supplying breathable gas in an aircraft, having:

a storage supply of pressurized breathable gas;

a feed pipe for feeding gas from said storage to individual fast doning masks upon emergency conditions, said fast doning masks being constructed to exhaust gas contained in the feed pipe when being doned on the face of a wearer; and test means for testing said installation, comprising:

a motor driven atmospheric air compressor having an intake and a delivery outlet;

a permeation filter having an inlet connected to said delivery outlet, for delivering air depleted in oxygen containing products at an outlet thereof when fed by said compressor;

manually operable switch means for energizing and de-energizing the motor of said atmospheric air compressor;

and an automatically actuated two-position selector valve having an output in communication with said feed pipe, a first inlet connected to receive compressed air from said outlet of said permeation filter and a second inlet in continuous communication with said storage supply, said selector valve being constructed so that it automatically connects said storage supply to said feed pipe and separates the feed pipe from the compressor when not fed by compressed air from said compressor and it separates the feed pipe from the supply when said first inlet receives pressurized air from the compressor.

* * * * *